(12) United States Patent
Graham

(10) Patent No.: US 6,271,864 B1
(45) Date of Patent: Aug. 7, 2001

(54) REPRESENTING A PATH AS AN OBJECT WITH TRANSFORMATION CAPABILITY

(75) Inventor: James Graham, Sunnyvale, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 08/885,620

(22) Filed: Jun. 30, 1997

(51) Int. Cl.[7] ................................................. G06T 11/60

(52) U.S. Cl. ............................................ 345/442; 345/433

(58) Field of Search .................................... 345/442, 433

(56) References Cited

U.S. PATENT DOCUMENTS

| | | | |
|---|---|---|---|
| 5,291,585 | 3/1994 | Sato et al. ............................... | 710/10 |
| 5,307,451 | * 4/1994 | Clark ...................... | 345/433 |
| 5,335,320 | 8/1994 | Iwata et al. ............................... | 717/4 |
| 5,345,550 | 9/1994 | Bloomfield .......................... | 345/353 |
| 5,347,627 | 9/1994 | Hoffmann et al. ................... | 345/334 |
| 5,384,911 | 1/1995 | Bloomfield .......................... | 345/433 |
| 5,412,772 | 5/1995 | Monson ................................ | 345/335 |
| 5,414,806 | 5/1995 | Richards .............................. | 345/435 |
| 5,423,034 | 6/1995 | Cohen-Levy et al. ................. | 707/10 |
| 5,430,836 | 7/1995 | Wolf et al. ............................ | 345/335 |
| 5,436,637 | 7/1995 | Gayraud et al. ...................... | 345/116 |
| 5,448,695 | 9/1995 | Douglas et al. ...................... | 345/333 |
| 5,461,399 | 10/1995 | Cragun ................................. | 345/145 |
| 5,461,710 | 10/1995 | Bloomfield et al. ................. | 345/349 |
| 5,473,745 | 12/1995 | Berry et al. ........................... | 345/340 |
| 5,491,784 | 2/1996 | Douglas et al. ...................... | 345/352 |
| 5,493,638 | 2/1996 | Hooper et al. ........................ | 345/435 |
| 5,500,927 | * 3/1996 | Sander-Cederlof et al. ......... | 345/433 |
| 5,509,116 | 4/1996 | Hiraga et al. .......................... | 707/1 |
| 5,526,517 | 6/1996 | Jones et al. ............................ | 707/8 |

(List continued on next page.)

OTHER PUBLICATIONS

Lafore, R., "The Waite Group's Object–oriented Programming in C++ 2nd ed.", Corte Madera, CA: Waite Group Press, pp. 312–323, Jan. 1995.*
Ronald L. Johnston, "The Dynamic Incremental Compiler of APL/3000" Proceedings of the API '79 Conference, published as APL Quote Quad, 9(4), p 82–87.
Leo J. Guibas et al., "Compilation and Delayed Evaluation in APL," Fifth Annual Synposium on Principles in Programming Languages, p 1–8, 1978.
Gleen Krasner "The Smalltalk–80 Virtual Machine" BYTE Publications Inc., Aug. 1991, pp 300–320.

*Primary Examiner*—Mark R. Powell
*Assistant Examiner*—Jeffrey Allen Rossi
(74) *Attorney, Agent, or Firm*—The Hecker Law Group

(57) ABSTRACT

One or more embodiments provide the ability to use multiple path formats in an object oriented system. A path maintains the ability to translate itself into a recognizable format for use by applications. The recognizable format may be a standard Bezier Path format or an iterator that provides the ability to iterate along the path, one curve segment at a time. Multiple applications may use the self-translation ability. In one embodiment, when an application desires to perform a transform, it determines if the transform may be performed on the path (i.e., whether the path is recognizable). If the path is recognizable, the transform is performed directly on the path. If the path is not recognizable, the path translates itself into a recognizable format and the transform performs the action on the recognizable path (the transform must maintain the ability to perform the transform on the standard format). Determining whether the path is recognizable may consist of a two stage negotiation process. During the first stage the path determines if it recognizes the transform. If the path does not recognize the transform, the desired operation is passed onto the transform in the second stage where it is determined if the transform recognizes the path. If the path or the transform is recognizable in either stage the action is performed. However, in the second stage, if the path is not recognizable, the transform requests the path to translate itself and performs the operation on the recognizable path returned.

44 Claims, 7 Drawing Sheets

U.S. PATENT DOCUMENTS

| | | | |
|---|---|---|---|
| 5,544,288 | 8/1996 | Morgan et al. | 345/342 |
| 5,546,519 | 8/1996 | Berry | 345/340 |
| 5,548,702 | 8/1996 | Li et al. | 345/346 |
| 5,550,968 | 8/1996 | Miller et al. | 345/332 |
| 5,559,942 | 9/1996 | Gough et al. | 345/349 |
| 5,564,003 | 10/1996 | Bell et al. | 345/326 |
| 5,566,330 | 10/1996 | Sheffield | 707/4 |
| 5,570,462 | 10/1996 | McFarland | 345/436 |
| 5,572,643 | 11/1996 | Judson | 709/218 |
| 5,694,603 | 12/1997 | Reiffin | 709/107 |
| 5,694,604 | 12/1997 | Reiffin | 709/107 |
| 5,731,820 * | 3/1998 | Broekhuijsen et al. | 345/442 |
| 5,978,582 * | 11/1999 | McDonald et al. | 345/433 |
| 5,986,667 * | 11/1999 | Jevans et al. | 345/433 |

* cited by examiner

REPRESENTING A PATH AS AN OBJECT WITH TRANSFORMATION CAPABILITY

BACKGROUND OF THE INVENTION

1. Field of the Invention

This invention relates to the field of two dimensional paths. More particularly, the invention relates to using and accessing path information maintained in multiple formats in an object oriented system.

2. Background Art

When drawing or printing to a display device or printer, an application developer uses a two dimensional path that is filled or stroked with a pen. A path consists of a combination of elements such as lines and curves. Rendering code is designed to handle certain formats of path elements (certain types of lines and curves), but some applications may want to specify their paths in an alternative format. In the prior art, an application that didn't understand a particular path format was unable to process and utilize that path. Thus, for a device or application to utilize a path, the developer was forced to specify the path in a standard form (in the standard form, only one type of curve segment exists, a Bezier curve segment) to the device directly. Consequently, only a limited set of recognizable paths could be used and customizable formats were not permissible. Such a format restriction is not flexible and limits the developer's use of numerous applications. A background of paths and object oriented systems is described below.

Paths

A path is a two dimensional (2D) trajectory on a drawing surface that can be filled or stroked with a pen. For example, the lines and curves that constitute a text character are paths. Each path may be broken down into a series of lines and curves. Referring to FIG. 2, the text character "R" is comprised of a series of lines and curves: line 201–204; curve 201–202; and line 203–205. The combination of the line 201–204, curve 201–202, and line 203–205 constitute a path for the character "R". The path may be in varying formats. A standard path format that is commonly used is a Bezier path. A Bezier path contains a combination of lines and Bezier curves. A Bezier curve is constructed by blending a set of control points to form a composite describing the curve. For example, referring to FIG. 2, points 201, 206, 207, and 202 are control points used in constructing the Bezier curve 201–202. Polynomial functions blend the four control points to result in the actual curve. Consequently, to construct a Bezier curve, a polynomial function accepts multiple control points and forms a composite function that describes the curve.

The method for developing a Bezier curve (and a resulting path) may not be used in all applications. For example, some applications may use a Spline curve or another customizable format. Further, there are formats that can be used to represent a path that don't translate directly into a rendering algorithm such as a format that might be used to edit a path in a drawing program. With such a format, the prior art forces the drawing program to edit the curve segments as Bezier segments and does not permit the drawing program to use its own format (which may use rational coordinates). Using its own format, the individual coordinates could be edited or transformed more rapidly and efficiently than performing the transform on the forced Bezier path.

To transform a path (e.g., rotate, scale, etc.), the prior art requires a specific type of transform and a specific type of path. The transform and an object that operates on the path expects this specific type of path. If there is more than one form, separate calls are made to transform the path from each of the different formats to the standard format (e.g., one call would render or transform one kind of path and another call would render or transform the other type of path). These calls would have to be enumerated in the object and may not be performed when the developer desires it.

The prior art limits developers to the use of a standard Bezier path. Other types of paths including custom paths must be transformed to a Bezier path prior to utilization by a developer. The lack of flexibility and inability to access and use multiple path formats at the developer's option necessitates the need for the present invention.

SUMMARY OF THE INVENTION

A path defines a two dimensional trajectory on a drawing surface that can be filled or stroked with a pen. Paths may be expressed in a plethora of formats. However, for an application to manipulate, transform or perform other operations on a path (e.g., rotate or scale the path), prior art requires the developer to specify the path in the standard format (a Bezier path). Such a limitation prohibits drawing programs or developers from fully utilizing their artistic ability to create paths in unknown or custom formats.

One or more embodiments of the invention provide the ability to use multiple path formats. A path is stored in an arbitrary format that is often unrecognizable in various applications. One or more embodiments provide the path with the ability to translate itself into a recognizable format. A variety of applications can then use the path's translation ability to perform desired operations after it is determined whether the transform may be performed on the path or not.

For example, in one or more embodiments, each path object maintains the ability to translate itself into a Bezier path format and return a new path object in the Bezier format. Consequently, when the application determines that the transform may not be performed on the path (i.e., it does not recognize the path), it simply requests the path object to translate itself and return the Bezier Path object. The transform or other operation is then performed on the Bezier Path object.

In another example, one or more embodiments of the invention provide for the paths to be viewed as shapes and stored in instances that implement a Shape Interface. In addition, iterators are defined that have the ability to iterate over each segment of the path (in the Shape object) and perform transforms or other operations one segment at a time. Thus, when it is determined that the transform may not be performed on the path (i.e., the path format is unrecognizable by the application that desires to perform the transform or other operation), an iterator object is retrieved. The iterator retrieves one segment of the shape at a time (and may convert it into a Bezier format) and allows the transform or other operation to be accomplished on the segment. In this manner, the transform or other operation may be applied to the entire shape, one segment at a time, on the fly, without translating the entire path at once into a Bezier Path.

Many applications may use a path's ability to translate itself into a recognizable format. For example, in one or more embodiments an application may desire to perform a transformation of the path. The transformation ability is provided by the implementation of a Transform Interface. When the application desires to perform a transformation, the transform determines if it understands the path format (i.e., is the path in a recognizable format). If the path is recognizable, the transform is performed directly on the path. If the path is not recognizable, it asks the path to transform itself into a recognizable format. The operation may then be performed on the recognizable format returned (e.g., a BezierPath format or a PathIterator).

One or more embodiments of the present invention provide a path with the ability to perform a transform to its points directly. In one or more embodiments, a two stage negotiation process utilizes this ability and permits a desired operation to be performed on a path in its initial format. In the first stage, the path determines if it recognizes the transform or other operation. If it does, then the path performs the transform or other operation itself. If the path does not understand the transform or other operation, in the second stage the path requests the transform or other operation to perform the desired operation. The transform or other operation then determines if it recognizes the path. If it does, the transform or other operation then performs the operation directly on the path. However, if the transform or other operation does not understand the path, the transform or other operation requests the path to translate itself and return a recognizable format. Once the recognizable format is returned by the path, the transform or other operation performs the operation.

Consequently, multiple path formats may be used and transformations or other operations may be performed on custom paths providing the flexibility to developers to utilize a variety of applications.

BRIEF DESCRIPTION OF THE DRAWINGS

FIG. 1 is a computer system that one or more embodiments of the invention may be implemented on.

DETAILED DESCRIPTION OF THE INVENTION

A system of accessing, using, and performing a transform or other operation on paths of multiple arbitrary formats is described. In the following description, numerous, specific details, such as the use of specific names for classes, are set forth in order to provide a more thorough understanding of the present invention. It will be apparent, however, to one skilled in the art, that the present invention may be practiced without these specific details. In other instances, well known features have not been described in detail so as not to unnecessarily obscure the present invention.
Embodiment of Computer Execution Environment (Hardware)

Figure 1:
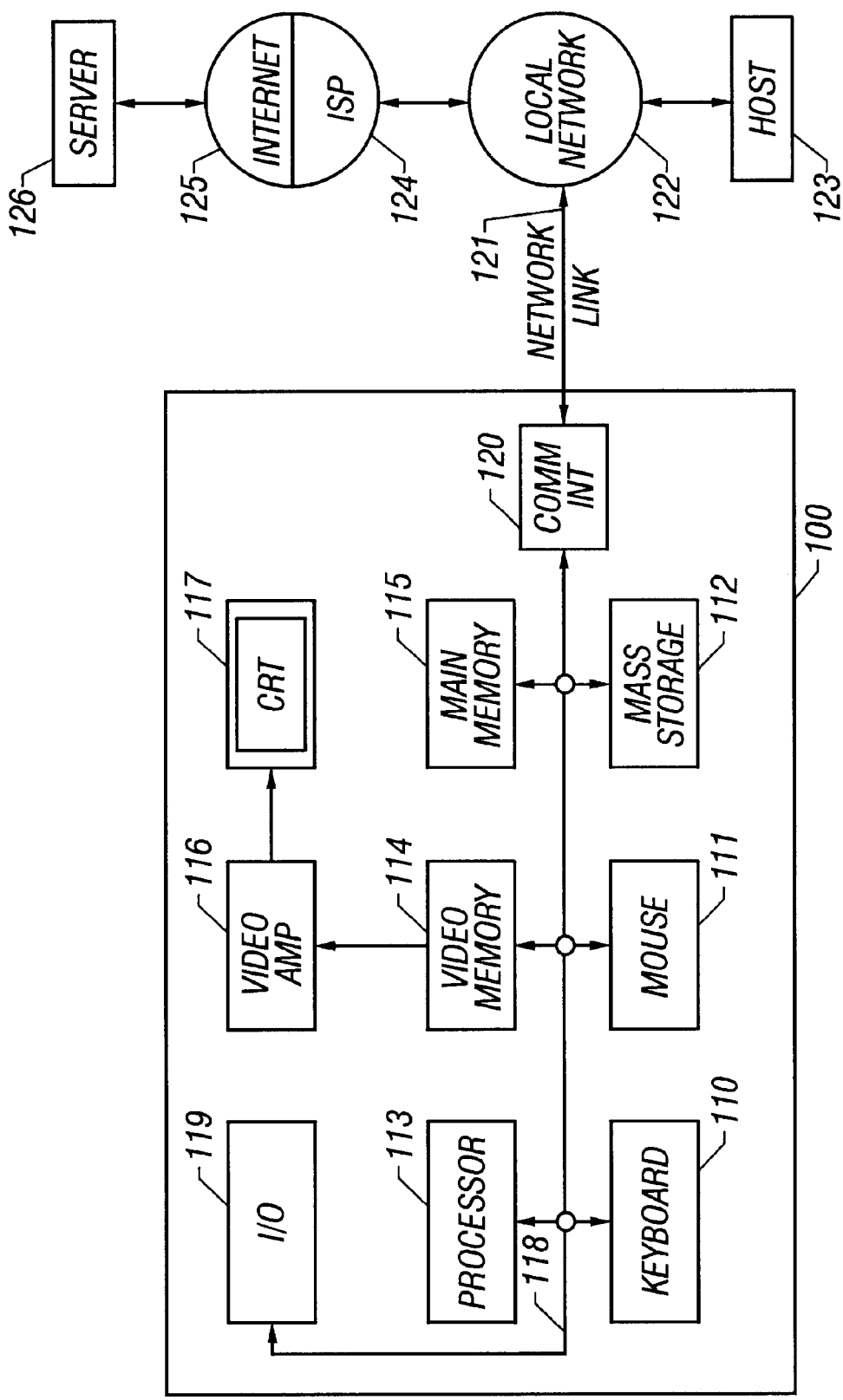
Figure 2:
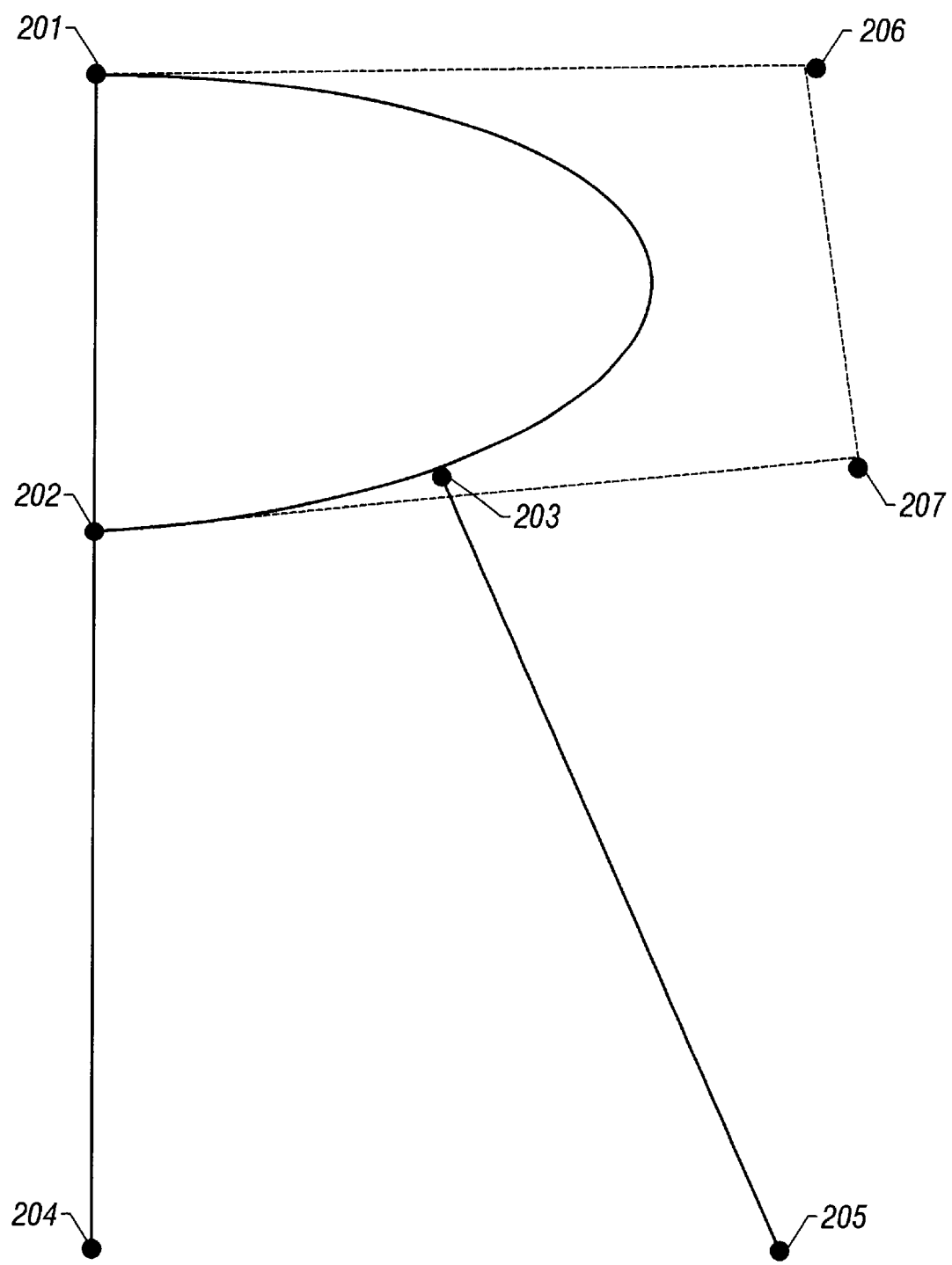
FIG. 2 demonstrates a Bezier path of the text character "R".

An embodiment of the invention can be implemented as computer software in the form of computer readable program code executed on a general purpose computer such as computer 100 illustrated in FIG. 1. A keyboard 110 and mouse 111 are coupled to a bi-directional system bus 118. The keyboard and mouse are for introducing user input to the computer system and communicating that user input to central processing unit (CPU) 113. Other suitable input devices may be used in addition to, or in place of, the mouse 111 and keyboard 110. I/O (input/output) unit 119 coupled to bi-directional system bus 118 represents such I/O elements as a printer, A/V (audio/video) I/O, etc.

Computer 100 includes a video memory 114, main memory 115 and mass storage 112, all coupled to bi-directional system bus 118 along with keyboard 110, mouse 111 and CPU 113. The mass storage 112 may include both fixed and removable media, such as magnetic, optical or magnetic optical storage systems or any other available mass storage technology. Bus 118 may contain, for example, thirty-two address lines for addressing video memory 114 or main memory 115. The system bus 118 also includes, for example, a 32-bit data bus for transferring data between and among the components, such as CPU 113, main memory 115, video memory 114 and mass storage 112. Alternatively, multiplex data/address lines may be used instead of separate data and address lines.

In one embodiment of the invention, the CPU 113 is a microprocessor manufactured by Motorola, such as the 680X0 processor or a microprocessor manufactured by Intel, such as the 80X86, or Pentium processor, or a SPARC microprocessor from Sun Microsystems. However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor 117. Video amplifier 116 is well known in the art and may be implemented by any suitable apparatus. This circuitry converts pixel data stored in video memory 114 to a raster signal suitable for use by monitor 117. Monitor 117 is a type of monitor suitable for displaying graphic images.

Computer 100 may also include a communication interface 120 coupled to bus 118. Communication interface 120 provides a two-way data communication coupling via a network link 121 to a local network 122. For example, if communication interface 120 is an integrated services digital network (ISDN) card or a modem, communication interface 120 provides a data communication connection to the corresponding type of telephone line, which comprises part of network link 121. If communication interface 120 is a local area network (LAN) card, communication interface 120 provides a data communication connection via network link 121 to a compatible LAN. Wireless links are also possible. In any such implementation, communication interface 120 sends and receives electrical, electromagnetic or optical signals which carry digital data streams representing various types of information.

Network link 121 typically provides data communication through one or more networks to other data devices. For example, network link 121 may provide a connection through local network 122 to host computer 123 or to data equipment operated by an Internet Service Provider (ISP) 124. ISP 124 in turn provides data communication services through the world wide packet data communication network now commonly referred to as the "Internet" 125. Local network 122 and Internet 125 both use electrical, electromagnetic or optical signals which carry digital data streams. The signals through the various networks and the signals on network link 121 and through communication interface 120, which carry the digital data to and from computer 100, are exemplary forms of carrier waves transporting the information.

Computer 100 can send messages and receive data, including program code, through the network(s), network link 121, and communication interface 120. In the Internet example, server 126 might transmit a requested code for an application program through Internet 125, ISP 124, local network 122 and communication interface 120. In accord with the invention, one such downloaded application is the representation of a path as an object with transformation capability described herein.

The received code may be executed by CPU 113 as it is received, and/or stored in mass storage 112, or other non-volatile storage for later execution. In this manner, computer 100 may obtain application code in the form of a carrier wave.

The computer systems described above are for purposes of example only. An embodiment of the invention may be implemented in any type of computer system or programming or processing environment.

One or more embodiments of the invention are implemented in an object oriented system and utilize Java™ (Java and all Java-based trademarks and logos are trademarks or registered trademarks of Sun Microsystems, Inc., in the United States and other countries), a computer programming language that is robust and may be utilized across multiple platforms. To fully understand the invention, it is useful to briefly discuss the Java™ programming language and object oriented systems.

Object Oriented System

Java is an object-oriented programming language. Object-oriented programming is a method of creating computer programs by combining certain fundamental building blocks, and creating relationships among and between the building blocks. The building blocks in object-oriented programming systems are called "objects." An object is a programming unit that groups together a data structure (instance variables) and the operations (methods) that can use or affect that data. Thus, an object consists of data and one or more operations or procedures that can be performed on that data. The joining of data and operations into a unitary building block is called "encapsulation.

An object can be instructed to perform one of its methods when it receives a "message." A message is a command or instruction to the object to execute a certain method. It consists of a method selection (name) and a plurality of arguments that are sent to an object. A message tells the receiving object what operations to perform.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are predominantly based on a "class" scheme. The class-based object-oriented programming scheme is generally described in Lieberman, "Using Prototypical Objects to Implement Shared Behavior in Object-Oriented Systems," OOPSLA 86 Proceedings, September 1986, pp. 214–223.

A class defines a type of object that typically includes both instance variables and methods for the class. An object class is used to create a particular instance of an object. An instance of an object class includes the variables and methods defined for the class. Multiple instances of the same class can be created from an object class. Each instance that is created from the object class is said to be of the same type or class.

A hierarchy of classes can be defined such that an object class definition has one or more subclasses. A subclass inherits its parent's (and grandparent's etc.) definition. Each subclass in the hierarchy may add to or modify the behavior specified by its parent class (also referred to as its superclass).

To illustrate, an employee object class can include "name" and "salary" instance variables and a "set_salary" method. Instances of the employee object class can be created, or instantiated for each employee in an organization. Each object instance is said to be of type "employee." Each employee object instance includes the "name" and "salary" instance variables and the "set_salary" method. The values associated with the "name" and "salary" variables in each employee object instance contain the name and salary of an employee in the organization. A message can be sent to an employee's employee object instance to invoke the "set_salary" method to modify the employee's salary (i.e., the value associated with the "salary" variable in the employee's employee object).

A developer may desire to have different implementations of a common method in each subclass. For example, suppose that a class A defines a method for printing the style of a font and that a class B defines a method for printing the point size of a font. Instead of providing for the same method in each class (with the only difference being the information that is printed), the Java™ programming language permits the developer to define an interface implemented by both class A and class B that prints information. A class definition of the interface simply defines the method signatures or prototypes that the implementing class must provide. Consequently, each class declares to implement the interface and creates their own implementation of the method. At run time, a reference to the commonly implemented method is resolved but the action or resolution of invoking that method will depend on how it is implemented in the particular object it is invoked on.

An object is a generic term that is used in the object-oriented programming environment to refer to a module that contains related code and variables. A software program can be written using an object-oriented programming language whereby the program's functionality is implemented using objects.

Path Translation/Transformation Capability

Paths are often created in custom and arbitrary formats. These custom formats may not be recognizable by numerous applications that desire to perform a transform or other operation on the path. To provide the ability for all applications to utilize a custom format path, one or more embodiments of the invention provide the path with the ability to translate itself into a recognizable format. The recognizable format that the path translates itself into may vary in its implementation and form. Examples of two such implementations in an object oriented system will now be described.

(1) Transformation into a Bezier Path

Figure 4:
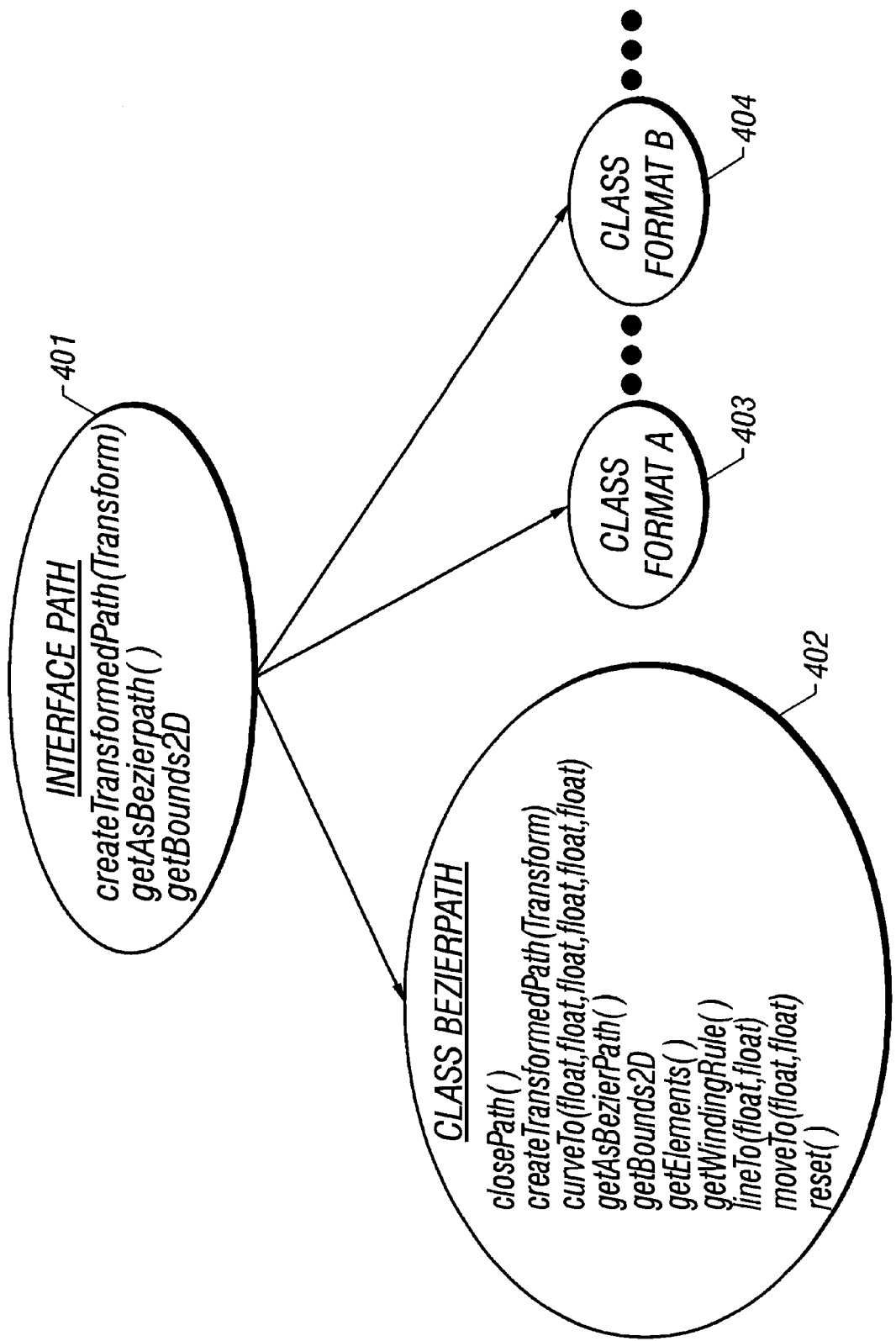
FIG. 4 describes one or more embodiments of the invention that define a path object structure and provides for the translation of a path into a recognizable format if desired.

If an application does not recognize the path format, the path (or path object) is translated into a recognizable format. In one embodiment, the path is translated into a Bezier Path format. FIG. 4 demonstrates the structure of an embodiment that implements the invention as described in this manner.

A Path Interface 401 is provided that may be implemented by multiple path formats 402–404. The Path Interface provides a common set of methods to manipulate all types of geometric path objects. Thus, the path interface provides the ability to use multiple path formats. The Path Interface requires each object that implements the interface to be able to convert itself to the common BezierPath format and to be able to transform or perform another operation on itself by an arbitrary Transform either to its points directly, or by supplying itself or a BezierPath conversion of itself to the Transform object. In one or more embodiments, the Path Interface contains one or more of the following methods:

(1) public abstract BezierPath getAsBezierPath( ) Returns a BezierPath object representing an approximation of this path expressed using only straight lines and Bezier curves.

(2) public abstract Rectangle2D getBounds2D( ) Returns the bounding box of the path.

(3) public abstract Path createTransformedPath (Transform t) Returns a new path representing this path transformed by the specified transform. The Transform object (T) and this Path object (P) will negotiate to produce the new transformed path using the following process:

1. P will determine if it recognizes the particular kind of transform that T represents and how to apply such a transform to its points directly. If so, then P will perform the transform and return the object representing the result.

2. If P does not recognize T, then it will call T.createTransformedpath(P) and return the results.

T will perform the createTransformedPath method as follows:

1. If T does not recognize the exact type of P or how to apply its coordinate transformation to the primitive segments of P, then T will covert P to a BezierPath object using P=P.getASBezierPath( ).

2. T will then transform the path segments of P and return a new path constructed from the transformed segments. Since all Transform objects must be able to transform a BezierPath object, this process should always succeed.

As defined, each path object 402–404 that implements the Path Interface must define a method to translate itself into a Bezier Path (i.e., the getAsBezierPath( ) method). In addition, each path object must define the createTransformedPath( ) method that returns a new path that is transformed by the Transform or other operation defined in a Transform object T (transforms and Transform objects are discussed below).

Consequently, when a Transform or other operation does not understand the path, it merely calls the getAsBezier Path( ) method for the path to translate itself into a Bezier Path.

Referring again to FIG. 4, paths of various formats (e.g., a BezierPath format 402, a custom FormatA 403, a custom FormatB 404, etc.) implement the Path Interface. The standard path format that all other paths must be able to translate themselves into is represented by Class BezierPath 402 (that also implements the Path Interface). The BezierPath class 402 represents a geometric path constructed from straight lines and Bezier curves. It can contain multiple subpaths. This type of Path is used directly to construct paths for rendering and it also represents the lowest common denominator to which other types of paths are reduced if and when various methods are unable to manipulate some other concrete form of Path object directly. In one or more embodiments of the invention, Class BezierPath is comprised of one or more of the following constructors and methods:

(1) public BezierPath(int rule) Constructs a new BezierPath object.

(2) public BezierPath(int rule, int initialCapacity) Constructs a new BezierPath object with the specified number of path coordinates. This number is an initial guess as to how many coordinates will be in the path.

(3) public synchronized void moveTo(float x, float y) Adds a point to the path by moving to the specified coordinates.

(4) public synchronized void lineTo(float x, float y) Adds a point to the path by drawing a straight line from the current coordinates to the new specified coordinates.

(5) public synchronized void curveTo(float x1, float y1,float x2,float y2,float x3, float y3) Adds 3 points to the path by drawing a Bezier curve from the current coordinates through the third set of specified coordinates, using the first and second sets of specified coordinates as Bezier control points.

(6) public synchronized void closePath( ) Closes the current subpath by drawing a straight line back to the coordinates of the last moveTo. If the path is already closed, then this method has no effect.

(7) public synchronized int getWindingRule( ) Returns the fill style winding rule. The winding rule specifies how the interior or a path will be determined. There are two types of winding rules: EVEN_ODD and NON_ZERO. An EVEN_ODD winding rule means that enclosed regions of the path alternate between interior and exterior areas as traversed from the outside of the path towards a point inside the region. For a NON_ZERO winding rule, we start by conceptually drawing a ray from a given point to infinity in any direction and then by examining all of the places where the path intersects the ray. We now traverse the path in one direction and keep track of the number of times that the path crosses the ray from left to right, and the number of times that the path crosses the ray from right to left. If these numbers are equal, the point is outside of the path. If they are not equal, the point is inside.

(8) public synchronized Rectangle2D getBounds2D( ) Returns the bounding box of the path.

(9) public synchronized BezierPathEnumerator getElements( ) Returns an enumerator for the path elements.

(10) public synchronized void reset( ) Resets the path to empty. The append position is set back to the beginning of the path and all coordinates and point types are forgotten.

(11) public BezierPath getAsBezierPath( ) Returns a BezierPath object representing an approximation of this path expressed using only straight lines and Bezier curves. Since this is the BezierPath class, the returned path is this same object.

(12) public synchronized Path createTransformedPath (Transform t) Returns a new transformed BezierPath.

The above BezierClass methods provide a means to obtain information and perform transformations or other operations on paths in the Bezier format. As indicated, all other path formats must maintain the ability to transform themselves into an instance of the BezierPath class. Further, as the BezierPath class methods indicate, various properties may be retrieved (using getBounds( ) and other methods) and a Transform may be performed on a BezierPath instance (using the createTransformedPath( ) method).

By providing a lowest common denominator (the BezierPath class), and the interface for additional paths to implement (the Path Interface), a method for using custom path formats and the ability to perform transformations or other operations on those custom paths is provided. The above classes and interfaces define one or more embodiments of the present invention.

(2) Transformation into an Iterator

In one or more embodiments, if the application does not recognize the path format, the application requests an iterator from the path object. An iterator is a mechanism for accessing all components of a given type. For example, if you have a class with a private array of integers, an iterator would access each integer element of the array. An iterator method could also print each value or return an object that contains the value if necessary. Differing from the Bezier Path conversion above, instead of translating the entire path into a new object containing a BezierPath, converting the path into an iterator returns an object that can simply iterate over the path, one segment at a time. By providing an iterator instead of translating into another object, it allows the translation of the custom path object into a set of Bezier segments to occur one curve segment at a time. Consequently, you never actually create an entire second copy of the path. It is simply read back in a different format.

Figure 6:
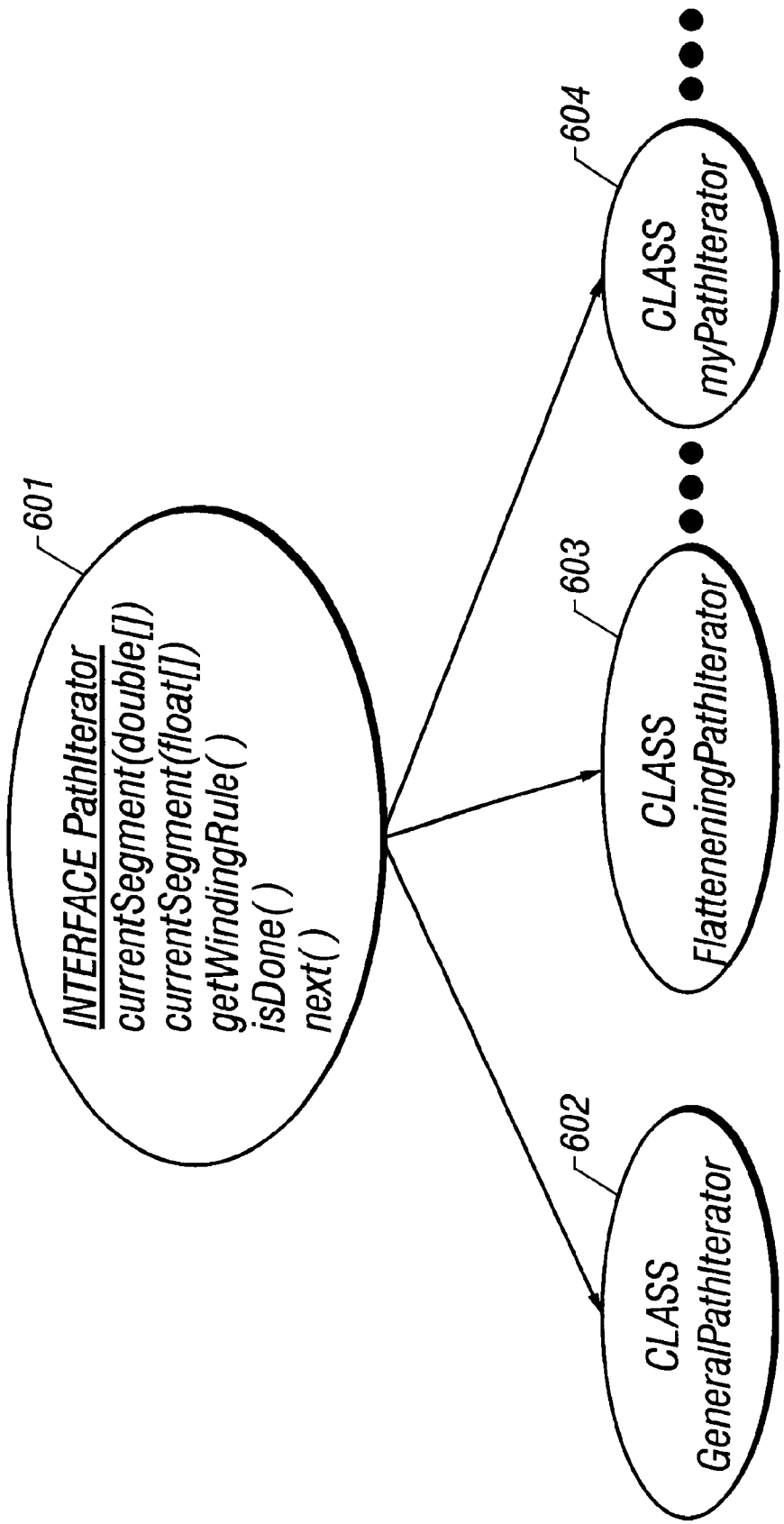
FIG. 6 describes one or more embodiments of the invention in conjunction with FIG. 5 that define an iterator that provides for the transform or other operation of a Shape one segment at a time.

As described, one or more embodiments provide for the creation of an iterator object that iterates and provides the ability to transform or perform other operations one segment of the path at a time. FIG. 6 demonstrates the structure and implementation of one or more embodiments of the invention that provide the ability to iterate path segments. An iterator 602–604 that iterates segments of a path must implement the PathIterator Interface 601. The PathIterator Interface provides methods to be implemented in order to provide a uniform manner of iterating along a path (no matter what the type of path format). In one or more embodiments, objects that implement the PathIterator Interface may define one or more of the following methods:

(1) public abstract int getWindingRule( ) Return the winding rule for determining the interior of the path.

(2) public abstract boolean isDone( ) Tests if there are more points to read and returns true if there are.

(3) public abstract void next( ) Moves the iterator to the next segment of the path forward along the primary direction of traversal as long as there are more points in that direction.

(4) public abstract int currentSegment(float Coords[ ]) Returns the coordinates and type of the current path segment in the iteration. The return value is the path segment type: SEG_MOVETO, SEG_LINETO, SEG_QUADTO, SEG_CUBICTO, or SEG_CLOSE. A float array of length 6 must be passed in and may be used to store the coordinates of the point(s). Each point is stored as a pair of float x, y coordinates. SEG_MOVETO and SEG_LINETO types will return one point, SEG_QUADTO will return two points, SEG_CUBICTO will return 3 points and SEG_CLOSE will not return any points.

(5) public abstract int currentsegment(double coords[ ]) Returns the coordinates and type of the current path segment in the iteration. The return value is the path segment type: SEG_MOVETO, SEG_LINETO, SEG_QUADTO, SEG_CUBICTO, or SEG_CLOSE. A double array of length 6 must be passed in and may be used to store the coordinates of the point(s). Each point is stored as a pair of double x, y coordinates. SEG_MOVETO and SEG_LINETO types will return one point, SEG_QUADTO will return two points, SEG_CUBICTO will return 3 points and SEG_CLOSE will not return any points.

The above PathIterator methods provide a manner of traversing a path (i.e., using the isDone( ) method and the next( ) method) and iterating or returning one path segment at a time to the requesting object (i.e., using the currentSegment( ) method). By defining an object that implements the PathIterator interface, a transform or other operation may be directly applied one segment of a path at a time. For example, a developer can use the currentSegment( ) method to retrieve a segment, use a transform object (discussed below) to perform a desired transform, use the isDone( ) to check for more segments, use the next( ) method to iterate the next segment if one exists and repeat the process.

Referring to FIG. 6, in one or more embodiments of the invention, the PathIterator Interface 601 may be implemented by several classes 602–604. Each of the classes 602–604 that implement the PathIterator interface define each method of the interface. For example, the Class GeneralPathIterator 602 contains the same five methods as the PathIterator Interface (i.e., currentSegment(double[ ]), currentSegment(float[ ]), getWindingRule( ), isDone( ), and next( ). The GeneralPathIterator 602 class represents the iterator for General Paths (discussed below). It can be used to retrieve all of the elements in a General Path. The GeneralPathIterator 602 can be used to iterate the path only once. Subsequent iterations require a new iterator. The Class FlatteningPathIterator 603 also implements all five of the PathIterator methods and returns a flattened view of another PathIterator object, which contains only line segments that approximate the curves. Other types of paths can use the FlatteningPathIterator class to provide flattening behavior for their paths without having to perform the interpolation calculations themselves. In addition to classes 602 and 603, other classes (such as Class myPathIterator 604) may implement the PathIterator Interface 601 to provide an iterator to provide the ability to conduct transforms and other operations. In this manner, the developer defines an iterator for the different path formats and enables future developers to utilize that iterator to perform standard and custom transformations and other operations (such as creating "stroked outlines" of the path, etc.).

The Shape Interface and Path Formats

Figure 5:
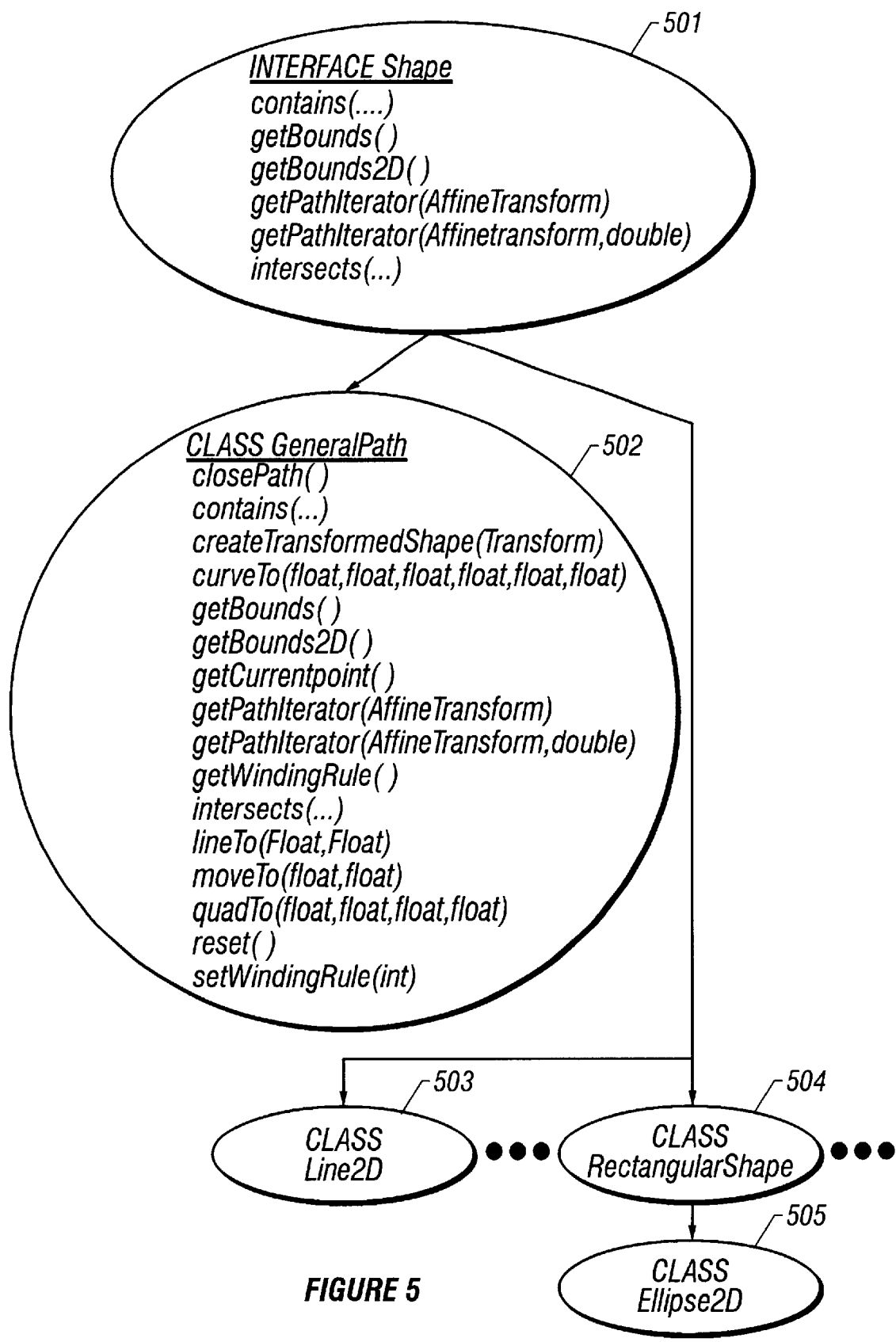
FIG. 5 describes one or more embodiments of the invention that define a Shape interface and structure.

A geometric object such as a rectangle may be represented by a path that forms the shape of a rectangle. Similarly, a geometric object such as a circle may be represented by a path that forms the shape of a circle. In this manner, many recognizable shapes may be viewed as a path that forms a certain recognizable pattern. To provide greater flexibility and to allow transforms and other operations to be quickly and easily applied to recognizable shapes, one or more embodiments of the invention provide for a Shape Interface. Referring to FIG. 5, the Shape Interface 501 provides the ability for a developer to define multiple shapes or paths 502–505. Thus, the Shape Interface 501 provides an interface for objects which represent some form of a geometric shape. In this manner, an application can check the Shape to determine if it is known (i.e., a rectangle, circle, or any object that implements the Shape Interface) and perform a translation on the known shape directly. In one or more embodiments, the Shape Interface provides for one or more of the following methods:

(1) public abstract Rectangle getBounds( ) Return the bounding box of the shape.

(2) public abstract Rectangle2D getBounds2D( ) Return the high precision bounding box of the shape.

(3) public abstract boolean contains(double x, double y) Test if a given coordinate is inside the boundary of the shape.

(4) public abstract boolean contains(Point2D p) Test if a given Point is inside the boundary of the shape.

(5) public abstract boolean intersects(double x, double y,double w,double h) Test if the interior of the Shape intersects the interior of a given set of rectangular coordinates.

(6) public abstract boolean intersects(Rectangle2D r) Test if the interior of the Shape intersects the interior of a given Rectangle.

(7) public abstract boolean contains(double x,double y, double w,double h) Test if the interior of the Shape entirely contains the given set of rectangular coordinates.

(8) public abstract boolean contains(Rectangle2D r) Test if the interior of the Shape entirely contains the given Rectangle.

(9) public abstract PathIterator getPathIterator (AffineTransform at) Return an iterator object that iterates along the boundary of the shape and provides access to the geometry of the outline of the shape. An optional affine transform can be specified in which case the coordinates returned in the iteration will be transformed accordingly.

(10) public abstract PathIterator getPathIterator (AffineTransform at, double flatness) Return an iterator object that iterates along the boundary of the shape and provides access to a flattened view of the geometry of the outline of the shape. Only SEG_MOVETO, SEG_LINETO, and SEG_CLOSE point types will be returned by the iterator. The amount of subdivision of the curved segments is controlled by the flatness parameter. An optional affine transform can be specified in which case the coordinates returned in the iteration will be transformed accordingly.

The above Shape Interface methods are defined by objects that implement the Shape Interface. Thus, any shape must be able to test whether a given rectangle is within the interior of the shape (using the contains( ) methods). In addition, the bounding box of the shape must be retrievable (using the getBounds( ) and getBounds2D( ) methods), and the Shape must be able to test if the interior of the shape intersects the interior of a given rectangle (using the intersects( ) methods).

One or more embodiments that provide the Shape Interface also provide for the getPathIterator( ) method within the interface. The getPathIterator( ) method forces a Shape developer to provide a method for obtaining an iterator object that will iterate along the boundary of the shape and provide access to the geometry of the outline of the shape. In addition, the developer provides for an optional transform that can be specified in which case the coordinates returned in the iteration will be transformed accordingly. Thus, each shape object must also have a corresponding iterator object in order to perform transformations.

Referring to FIG. 5, an example of a class that implements the Interface Shape is the GeneralPath class 502. The GeneralPath class represents a geometric path constructed from straight lines, quadratic and cubic (Bezier) curves, and can contain multiple subpaths. Multiple methods are defined in the GeneralPath class, including the methods specified in the Shape Interface 501. The GeneralPath shape class is associated with the GeneralPathIterator object discussed above. Consequently, when a developer calls the getPathIterator( ) method from an instance of the GeneralPath shape, an instance of the GeneralPathIterator will be created and returned. The GeneralPath class 502 is utilized to create objects (or provide an implementation of the Shape Interface) for general purpose paths which have no other custom format to store and manipulate their geometry. Custom shape objects should make their own custom Iterator object designed specifically for their implementation. In this manner, the GeneralPath class and GeneralPathIteratorClass provide general methods to transform, manipulate, or perform other operations on any desired shape or path.

In addition to the GeneralPath class 502, other objects such as instances of the Line2D class 503, or instances of the RectangularShape class 504 may implement the Shape Interface. The Line2D class 503 defines a line segment in (x,y) coordinate space. For the purposes of the Shape Interface, a coordinate is considered to be inside or contained by this line segment if the coordinate lies exactly on the line segment. The RectangularShape class 504 defines a base class for a number of shapes which inscribe a rectangular set of outer bounds (e.g., the Ellipse2D class 505). The RectangularShape class provides common manipulation routines for operating on a shape by querying and modifying its bounding rectangle. Thus, by defining particular shapes (such as the Line2d class 503 or RectangularShape class 504), common manipulation routines such as scaling or rotating may be performed quickly and efficiently since the path formats are recognizable (i.e., no translation may need to occur and transformations or other operations may be directly applied to the shape object itself).

By implementing the Shape Interface and the PathIterator Interface, one or more embodiments of the present invention allow the self-translation of custom path objects into a set of Bezier segments to occur, one curve segment at a time. As a result, an entire second copy of the path is never actually created. Further, a number of objects (or paths in common formats) can now implement the Shape Interface (e.g., rectangle, ellipse, arc, roundedRect, etc.). Thus, when queried, any one of these objects can produce an object that iterates over their path segment in the Bezier format on the fly. In addition, other objects in the Java™ environment can easily check to see whether a shape is a rectangle, ellipse, etc. and perform desired transformations or other operations directly. If it is not one of the known shapes, then the object can iterate over the path as a set of Bezier path segments and can render the shape as a Bezier path.

Transform Interface: Use of the Path Transformation/Translation Capability

The BezierPath and PathIterator implementations provide the ability for a path to translate itself into a recognizable format (using the getAsBezierPath( ) and getPathIterator( ) methods). Many applications may utilize this transformation capability. In one or more embodiments, a Transform Interface provides the ability to use the BezierPath implementation discussed above.

When an application desires to perform a transform (i.e., a geometric transformation of 2D coordinates such as an Affine Transform which translates, scales, or rotates the coordinates), the transform may be defined in an object that implements a Transform Interface (the Transform Interface is discussed below) (an object that implements the Transform Interface is referred to as a Transform object). A prerequisite for an object that implements the Transform Interface is that the object must be able to perform the transform on a path of the standard format (i.e., the Bezier Path format).

A class that implements the Transform Interface determines if it understands how to perform the transform on the path (i.e., if the path is in a recognizable format). If the path is unrecognizable, the Transform object requests the path to convert itself into a recognizable format (e.g., the standard BezierPath format) and the Transform object then performs the desired transform or other operation on the path.

Transform Interface

In one or more embodiments of the invention, a developer may define methods for transforming, manipulating, or performing other operations on a path. To ensure that application developers define methods uniformly, the Transform Interface is provided by one or more embodiments. The Transform Interface defines the minimal set of capabilities that a Transform object must support to operate properly. Transform objects represent geometric transformations of two dimensional (2D) coordinates. In each class that implements the interface, the methods must be defined. As a result, a developer that defines a transformation class (e.g., an AffineTransform or a PerspectiveTransform) must implement and define the methods provided in the Transform Interface. In addition, objects that implement the Transform Interface must maintain the ability to perform the transformation or operation on a Bezier Path (it can also maintain the ability to transform the path into other path formats). Consequently, if a developer desires to perform a transform or other operation on a path that is unrecognizable by the Transform path, the developer can always translate the path to a BezierPath and then perform the transformation or other operation. In one or more embodiments, the Transform Interface provides one or more of the following methods:

(1) public abstract Point2D transform(Point2D ptSrc, Point2D ptDst) Transforms the specified ptSrc and stores the result in ptDst. If ptDst is null, a new Point2D object will be allocated before storing. In either case, ptDst containing the transformed point is returned for convenience. Note that ptSrc and ptDst can be the same object. In this case, the input point will be overwritten with the transformed point.

(2) public abstract Point2D inverseTransform(Point2D ptSrc,Point2D ptDst) throws NoninvertibleTransformException Inverse transforms the specified ptSrc and stores the result in ptDst. If ptDst is null, a new Point2D object will be allocated before storing. In either case, ptDst containing the transformed point is returned for convenience. Note that ptSrc and ptDst can be the same object. In this case, the input point will be overwritten with the transformed point.

(3) public abstract Transform createInverse( ) throws NoninvertibleTransformException Returns a new Transform object representing the inverse of this Transform object.

(4) public abstract Path createTransformedPath(Path p) Returns a new Path object representing the specified path transformed by this transform. If the particular type of Path object is not directly understood by this Transform object, then under Option A, the transform should call the getAsBezierPath method on the Path object and transform that path. All objects which implement the Transform interface must be able to apply themselves to a BezierPath object. Under Option B, the transform should call the getPathIterator method and perform the transform on each iterated segment, one segment at a time.

(5) public abstract void prepend(Transform Tx) throws IncompatibleTransformException Prepends a Transform object Tx to this Transform object Cx. Cx is updated to perform the combined transformation. Transforming a point p by the updated transform Cx' is equivalent to first transforming P by Tx and then transforming the result by the original transform Cx. In other words, Cx'(p)=Cx(Tx(p)). Tx and Cx must be compatible Transform objects whose combination can be mathematically reduced the same class as Cx. Otherwise an exception is thrown.

(6) public abstract void append(Transform Tx) throws IncompatibleTransform Exception Appends a Transform object Tx to this Transform object Cx. Cx is updated to perform the combined transformation. Transforming a point p by the updated transform Cx' is equivalent to first transforming p by the original transform Cx and then transforming the result by Tx. In other words, Cx'(p)–Tx(Cx(p)). Tx and Cx must be compatible Transform objects whose combination can be mathematically reduced the same class as Cx. Otherwise as exception is thrown.

(7) public abstract Object clone( ) Returns a copy of the Transform object.

As indicated above, the createTransformedPath( ) method returns the specified path transformed by this transform. As a result, A Transform object may perform the transform on the path utilizing the transformation/translation capability of the path.

Accessing and Using a Path

Figure 3:
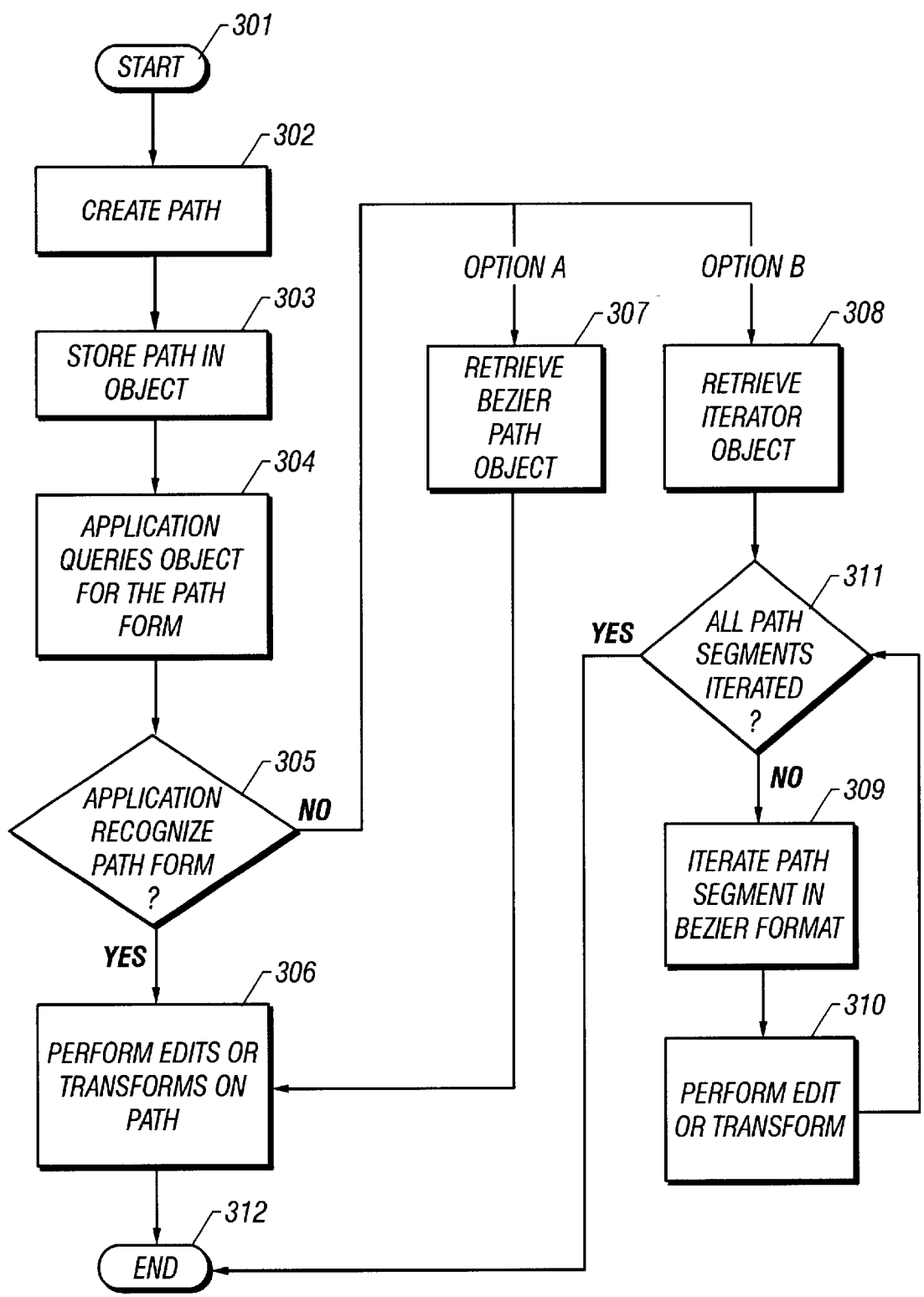
FIG. 3 is a method of one or more embodiments of the invention that provide for the ability to use paths of multiple formats.

The Transform Interface describes one or more embodiment's use of the self-translation ability of a path. FIG. 3 further describes two implementations (one of the the embodiments being the Transform Interface described above) of one or more embodiments of the process that may also utilize the transformation/translation capabilities of a path. The method starts at step 301 and at step 302 a path is created by an application (e.g., a drawing program). The path is comprised of a series of lines and curves and may constitute a shape such as a rectangle or ellipse. At step 303, the path is stored in an object. Depending on the embodiment of the invention, the path may be stored in various types of objects (discussed in detail below). At step 304, an application that desires to use the path (e.g., edit, scale, or transform the path) queries the object to determine the format of the path. The object returns the format of the path and at step 305, the requesting application determines whether the format is recognizable. If the format is recognizable and the application has the ability to understand and perform the desired edit or transformation directly on the path, then it does so at step 306. However, if the application does not understand the path format (i.e., the format is not recognizable), the invention provides for multiple options with which to proceed.

In one or more embodiments of the invention, Option A of FIG. 3 is implemented. In Option A, all path objects defined by the developer contain a method to transform themselves into a path object in the standard form (i.e., using the implementation of the Transform Interface and the BezierPath class as described above). Consequently, if the application does not recognize the path format and is unable to perform the transform, edit, or other operation on the format of the existing path, the application requests the path object to translate itself into the standard Bezier format path (using the getAsBezierPath( ) method described above). At step 307, the translated path is loaded into a BezierPath object and the BezierPath object is returned to the application.

Since all transform objects maintain the ability to perform transforms on the standard path format (i.e., a BezierPath), the translation into the BezierPath format is sufficient for the application to continue with its processing. Consequently, the application performs the desired edits or transforms on the BezierPath object at step 306 and the process ends at step 312. Similarly, all other operations to be performed on a path maintain the ability to perform the operation on the standard path format.

In one or more embodiments of the invention, Option B of FIG. 3 is implemented. In Option B, if the application does not recognize the path format, the application requests a PathIterator object from the object that contains the path at step 308 (i.e., using the PathIterator Interface as described above). Differing from Option A, instead of translating the entire path into a new object containing a BezierPath, Option B returns an object that can simply iterate over the path, one segment at a time. By providing an iterator instead of translating into another object, it allows the translation of the custom path object into a set of Bezier segments to occur one curve segment at a time. Consequently, you never actually create an entire second copy of the path (as in Option A). It is simply read back in a different format. Hence, at step 309, a segment of the path is iterated. The iteration retrieves the current path segment (using the currentsegment( ) method described above) and translates the segment into a standard format (i.e., a BezierPath format). The desired transformation, edit, or other operation is performed on the segment at step 310 and the iterator object determines whether or not all of the path segments have been iterated at step 311. If path segments remain in the object and not all path segments have been iterated, the iterator returns to step 309 and iterates the next segment (using the next( ) method of the PathIterator described above). Once all paths are iterated and the desired transform or operation is complete, the process ends at step 312.

As described in FIG. 3, if the object that implements the transform or other operation does not understand the path, it is translated into a Bezier Path and the transform or other operation may then be completed under Option A. Under Option B, an object that iterates the path is retrieved, and the transform or other operation is performed one segment on the time on the iterated segment. Thus, the transformation capabilities of a path may be utilized by a plethora of embodiments.

Two Stage Negotiation

The above described process provides for the ability to use multiple path formats. To provide greater flexibility, the above process may be modified during the determination of whether the transform or other operation may be performed on the path.

In one or more embodiments, an arbitrary transform (or other operation) and/or a path with an arbitrary transform are provided. By providing a path with an arbitrary transform, a path maintains the ability to perform the transform on its points directly. By providing an arbitrary transform, a Transform object may maintain the ability to perform the transform operation on the path. In this manner, two mechanisms for performing the transform are available: one in the path itself, and one in the transform object.

Figure 7:
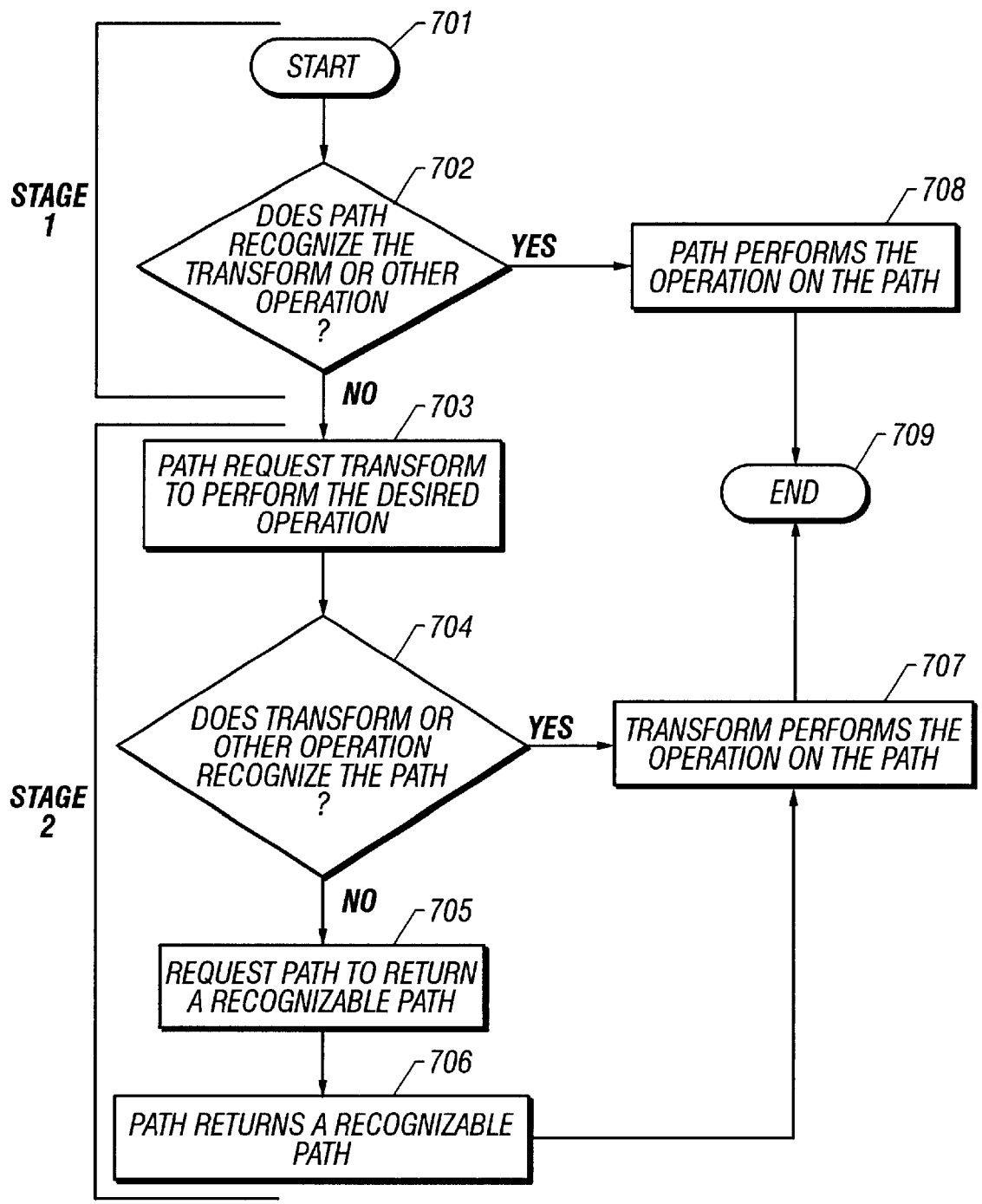
FIG. 7 describes one or more embodiments of the invention that use a two stage negotiation process to determine if the transform or other operation can be directly performed on the path.

One or more embodiments of the invention maintain the ability to utilize the two transforming mechanisms and are described in FIG. 7. The determination process begins at step 701. During Stage One, the path with the arbitrary transform determines whether it recognizes the transform or other operation at step 702. If it does, the path performs the transformation and applies the transform to its points directly at step 708 and the process ends at step 709.

If the path does not recognize the transform or other operation, in Stage 2, the path requests the transform or other operation to perform the desired action at step 703. The transform or other operation determines if it recognizes the path at step 704. If the path is recognizable, the desired transform or other operation is performed on the path by the transform at step 707 and the process ends at step 709. Thus, one or more embodiments provide the ability to perform the desired action without translating the path at two stages: first, at step 708 (if the path recognizes the transform or other operation at step 702), and second, at step 707 (if the transform or other operation recognizes the path at step 704).

If the transform or other operation does not recognize the path at step 704, it requests the path to translate itself into a recognizable format and return the recognizable path at step 705. The path performs the desired translation and returns the recognizable path to the transform at step 706. As discussed above, the recognizable format may be the Bezier Path or it may be a Path Iterator in one or more embodiments. At step 707, the transform or other operation performs the desired action on the recognizable path and the two stage negotiation ends at step 709.

In the above manner, one or more embodiments provide the ability to use multiple format paths and their self-translation capability in a two stage negotiation process that provides flexibility and the ability to use the path in an unaltered form twice prior to performing a translation.

Thus, a method and apparatus for providing use (including the ability to transform) and access to paths of multiple formats has been described in conjunction with one or more specific embodiments. One or more embodiments of the invention are described above. However, the invention is not limited to the above description and is defined by the claims and their full scope of equivalents.

What is claimed is:

1. In a computer system, a method for using and performing operations on multiple path formats, said method comprising the steps of:

obtaining a path in a path format;

performing a transform;

determining if said path recognizes said transform;

if said path recognizes said transform, said path performing said transform;

if said path does not recognize said transform, determining if said transform recognizes said path;

if said transform recognizes said path, said transform performing said transform;

if said transform cannot be performed on said path in said path format:

retrieving a representation of said path that said transform can be performed on; and performing said transform with said path representation.

2. The method of claim 1, wherein said step of retrieving a representation of said path that said transform can be performed on comprises the steps of:

translating said path into a path of a recognizable format; and returning said recognizable format path.

3. The method of claim 2, wherein said recognizable path format is a Bezier path format.

4. The method of claim 1 wherein said computer system is an object oriented computer system.

5. The method of claim 1, wherein said step of retrieving a representation of said path that said transform can be performed on comprises of the steps of:

obtaining an iterator that iterates segments of said path;

returning said iterator.

6. The method of claim 5, wherein said step of performing said transform with said path representation comprises the steps of:

iterating a segment of said path;

performing said transform on said path segment; and if not all path segments have been iterated, repeating said iterating and performing steps.

7. The method of claim 1 further comprising the step of storing said path in a path format in an object.

8. The method of claim 7 wherein said object represents some form of a geometric shape.

9. The method for using and performing operations on multiple path formats of claim 1, wherein said method is described by an interface and implemented by an object.

10. The method of claim 1 wherein said transform is a geometric transform of the coordinates.

11. The method of claim 1 wherein said transform is an operation performed on said path that modifies said path's form.

12. A computer system comprising:
    a processor;
    a memory coupled to said processor;
    object code executed by said processor that provides at least one method to use or perform operations on multiple path formats within said memory;
    said object code configured to:
        obtain a path in a path format; and
        perform a transform;
    said object code comprises:
        object code configured to determine if said path recognizes said transform;
        object code configured for said path to perform said transform if said path recognizes said transform;
        object code configured to determine if said transform recognizes said path if said path does not recognize said transform; and
        object code configured for said transform to perform said transform on said path if said transform recognizes said path;
        if said transform cannot be performed on said path in said path format:
            retrieve a representation of said path that can perform said transform; and
            perform said transform with said path representation.

13. The computer system of claim 12, wherein said object code executed by said processor configured to retrieve a representation of said path that can perform said transform comprises:
    object code executed by said processor configured to translate said path into a path of a recognizable format; and
    object code executed by said processor configured to return said recognizable format path.

14. The computer system of claim 13, wherein said recognizable path format is a Bezier path format.

15. The computer system of claim 12, wherein said object code executes in an object oriented environment.

16. The computer system of claim 12, wherein said object code configured to retrieve a representation of said path that said transform can be performed on comprises:
    object code configured to obtain an iterator that iterates segments of said path;
    object code configured to return said iterator.

17. The computer system of claim 12, wherein said object code configured to perform said transform step comprises:
    object code configured to iterate a segment of said path;
    object code configured to perform said transform on said path segment;
    object code configured to repeat said iterate and perform steps if not all path segments have been iterated.

18. The computer system of claim 12 further comprising object code configured to store said path in a path format in an object.

19. The computer system of claim 18 wherein said object represents some form of a geometric shape.

20. The computer system of claim 12 wherein said object code is described by an interface and implemented by an object.

21. The computer system of claim 12 wherein said transform is a geometric transform of the coordinates.

22. The computer system of claim 12 wherein said transform is an operation performed on said path that modifies said path's form.

23. An article of manufacture comprising:
    a computer usable medium having computer readable program code embodied therein configured to use or perform operations on multiple path formats, the computer readable program code in said article of manufacture comprising:
        computer readable program code configured to cause a computer to obtain a path in a path format;
        computer readable program code configured to cause said computer to perform a transform;
        computer readable program code configured to cause said computer to determine if said path recognizes said transform;
        computer readable program code configured to cause said computer to have said path perform said transform if said path recognizes said transform;
        computer readable program code configured to cause said computer to determine if said transform recognizes said path when said path does not recognize said transform;
        computer readable program code configured to cause said computer to have said transform perform said transform on said path when said transform recognizes said path;
        if said transform cannot be performed on said path in said path format, computer readable program code configured to cause said computer to:
            retrieve a representation of said path that said transform can be performed on; and
            perform said transform with said path representation.

24. The article of manufacture of claim 23 wherein said code configured to cause a computer to retrieve a representation of said path that said transform can be performed on comprises:
    computer readable program code configured to cause said computer to translate said path into a path of a recognizable format;
    computer readable program code configured to cause said computer to return said recognizable format path.

25. The article of manufacture of claim 24 wherein said recognizable path format is a Bezier path format.

26. The article of manufacture of claim 23 wherein computer readable program code is executed in an object oriented environment.

27. The article of manufacture of claim 23 wherein said code configured to retrieve a representation of said path that said transform can be performed on comprises:
    computer readable program code configured to cause said computer to obtain an iterator that iterates segments of said path;
    computer readable program code configured to cause said computer to return said iterator.

28. The article of manufacture of claim 23 wherein program code configured to cause said computer to perform said transform is comprised of:

computer readable program code configured to cause said computer to iterate a segment of said path;

computer readable program code configured to cause said computer to perform said transform on said path segment;

if not all path segments have been iterated, computer readable program code configured to cause said computer to repeat said iterate and perform computer readable program code.

29. The article of manufacture of claim 23 further comprising computer readable program code configured to cause said computer to store said path in a path format in an object.

30. The article of manufacture of claim 29 wherein said object represents some form of a geometric shape.

31. The article of manufacture of claim 23 wherein said computer readable program code is described by an interface and implemented by an object.

32. The article of manufacture of claim 23 wherein said transform is a geometric transform of the coordinates.

33. The article of manufacture of claim 23 wherein said transform is an operation performed on said path that modifies said path's form.

34. A computer data signal embodied in a carrier wave and representing sequences of instructions which, when executed by a processor, cause said processor to use and perform operations on multiple path formats by performing the steps of:

obtaining a path in a path format;

performing a transform;

determining if said path recognizes said transform;

if said path recognizes said transform, said path performing said transform;

if said path does not recognize said transform, determining if said transform recognizes said path;

if said transform recognizes said path, said transform performing said transform;

if said transform cannot be performed on said path in said path format:
  retrieving a representation of said path that said transform can be performed on; and
  performing said transform with said path representation.

35. The computer data signal of claim 34, wherein said step of retrieving a representation of said path that said transform can be performed on comprises the steps of:

translating said path into a path of a recognizable format; and returning said recognizable format path.

36. The computer data signal of claim 35, wherein said recognizable path format is a Bezier path format.

37. The computer data signal of claim 34 wherein said steps are implemented in an object oriented system.

38. The computer data signal of claim 34, wherein said step of retrieving a representation of said path that said transform can be performed on comprises of the steps of:

obtaining an iterator that iterates segments of said path;

returning said iterator.

39. The computer data signal of claim 34, wherein said step of performing said transform with said path representation comprises the steps of:

iterating a segment of said path;

performing said transform on said path segment;

if not all path segments have been iterated, repeating said iterating and performing steps.

40. The computer data signal of claim 34 wherein said sequences of instructions, when executed by said processor, cause said processor to perform the further step of storing said path in a path format in an object.

41. The computer data signal of claim 40 wherein said object represents some form of a geometric shape.

42. The computer data signal of claim 34, wherein said steps are described by an interface and implemented by an object.

43. The computer data signal of claim 34 wherein said transform is a geometric transform of the coordinates.

44. The computer data signal of claim 34 wherein said transform is an operation performed on said path that modifies said path's form.

* * * * *